United States Patent [19]

Touchet

[11] Patent Number: 4,772,195

[45] Date of Patent: Sep. 20, 1988

[54] DISTRIBUTING DEVICE FOR THE MANUFACTURE OF MULTI-LAYER SHEETS

[75] Inventor: Daniel J. Touchet, Mainvilliers, France

[73] Assignee: ONO, Auneau, France

[21] Appl. No.: 4,135

[22] Filed: Jan. 16, 1987

[30] Foreign Application Priority Data

Jan. 17, 1986 [FR] France ............... 86 00647

[51] Int. Cl.[4] .......................................... B29C 47/10
[52] U.S. Cl. ................................ 425/131.1; 137/884; 156/500; 251/121; 425/133.5; 425/145; 425/462
[58] Field of Search ............... 425/133.5, 131.1, 133.1, 425/145, 147, DIG. 243, 462, 465, 466, 130; 264/176.1; 156/244.11, 500; 251/121; 137/605, 884

[56] References Cited

U.S. PATENT DOCUMENTS

| 3,435,483 | 4/1969 | Heiner et al. | 425/131.1 X |
| 3,464,087 | 9/1969 | Koch | 425/133.5 |
| 3,480,998 | 12/1969 | Von Erdberg | 425/133.5 |
| 3,611,492 | 10/1971 | Scheibling | 425/133.5 |
| 3,687,589 | 8/1972 | Schrenk | 425/133.5 X |
| 3,694,119 | 9/1972 | Scheibling | 425/133.5 |
| 3,909,170 | 9/1975 | Riboulet et al. | 425/133.5 |
| 3,918,865 | 11/1975 | Nissel | 425/131.1 |
| 4,483,669 | 11/1984 | Hahn et al. | 425/133.5 X |
| 4,540,537 | 9/1985 | Kamp | 425/131.1 X |

FOREIGN PATENT DOCUMENTS

| 2554239 | 6/1977 | Fed. Rep. of Germany . | |
| 2437289 | 4/1980 | France | 425/133.5 |
| 2559419 | 8/1985 | France . | |
| 2559420 | 8/1985 | France . | |

Primary Examiner—Richard L. Chiesa
Attorney, Agent, or Firm—Wenderoth, Lind & Ponack

[57] ABSTRACT

Device for distributing thermoplastic or like material introduced into a feed assembly of a die for manufacturing multi-layer sheets which is connected to at least two supplies and comprises an assembly of elements (10 to 13) juxtaposed in such manner as to define a central channel (16) and including at least one radial channel (18, 25, 29, 32) opening into said central channel (16), the device comprising, in the region of the junction of the radial channel (25, 29, 32) supplying additional material introduced on the receiving material previously introduced into the central channel (16), a progressive regulating means (50) disposed in each corresponding element (11, 12, 13) of the feed assembly so as to instantaneously modify in the plane of superimposition of the thermoplastic materials the cross-sectional shape of the corresponding stream of additional material in the central channel (16) so as to obtain the desired distribution of this material in the sheet at the outlet of the die.

21 Claims, 3 Drawing Sheets

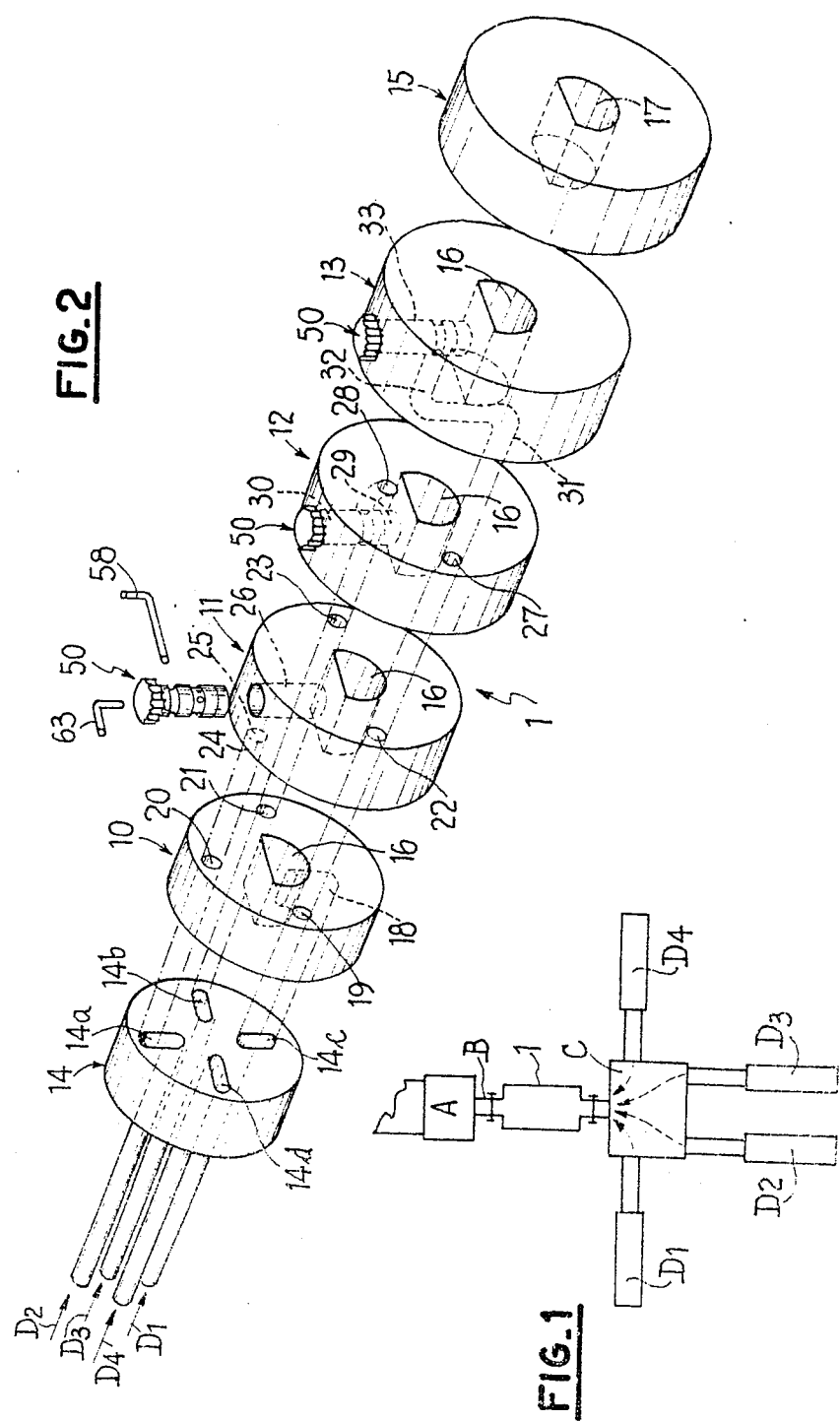

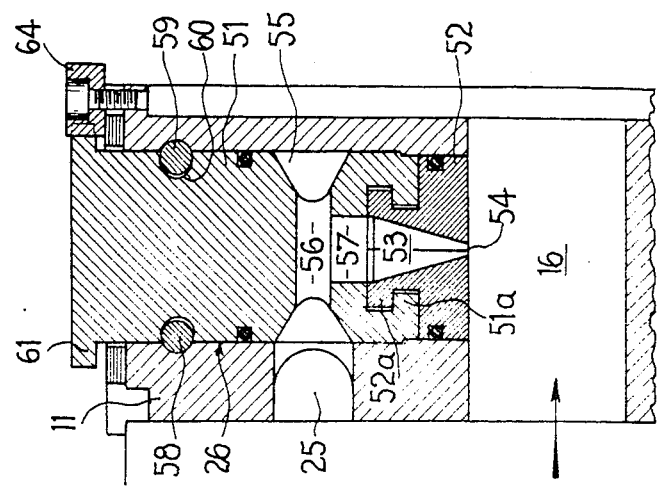
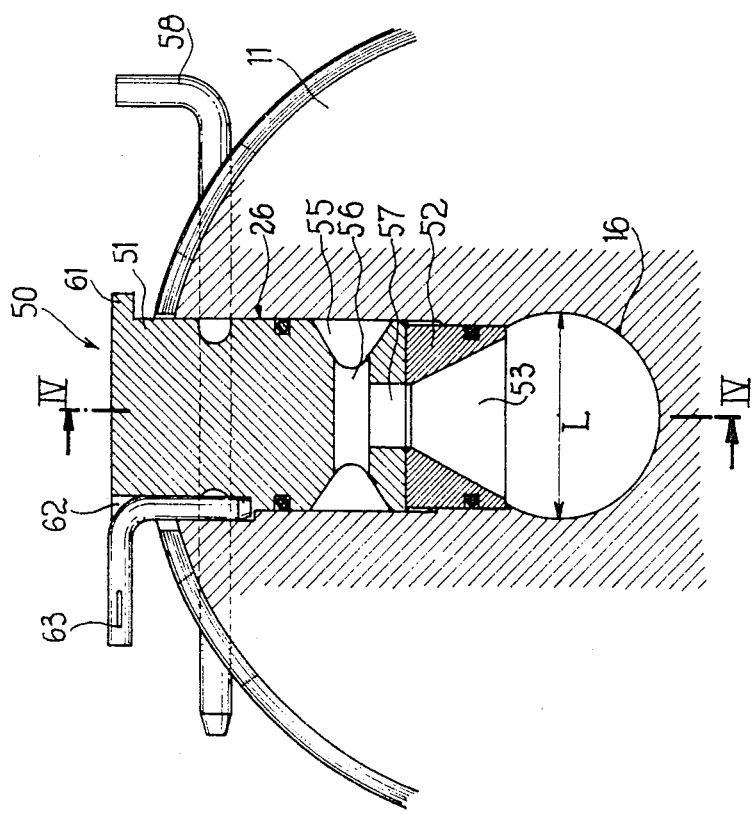

DISTRIBUTING DEVICE FOR THE MANUFACTURE OF MULTI-LAYER SHEETS

BACKGROUND OF THE INVENTION

1. Field of the Invention

The present invention relates to the manufacture of sheets comprising superimposed layers of thermoplastic or other material, by the simultaneous extrusion of various materials and then by the uniting thereof before they are introduced into a die.

2. Description of the Prior Art

In order to unite the materials while avoiding their mixture, they are introduced in coaxial, or at least parallel, flows into the inlet passageway of a die. The use of coaxial cylindrical flows permit the obtainment of a sheet comprising an inner layer and at least one layer enveloping this inner layer. The sheet is always constituted by a sandwich material in which the layers are disposed symmetrically or otherwise relative to the inner layer.

In order to overcome this, it has already been envisaged to dispose in the path of the flows radial partition walls so as to divide the outer flows and permit the injection of different materials on each side of the inner layer. In other cases, parallel conduits separated by partition walls are employed in which the various materials are introduced, these materials coming into contact with one another only at the end of a given parallel path so as to avoid any risk of turbulent flow and mixing.

The document FR-A-No. 2 437 289 of the assignee of the present invention discloses a feed device of a die for manufacturing multi-layer sheets of thermoplastic material which is connected to at least two thermoplastic material extruders and in which a plurality of flows of material are united in a central passageway connected to the inlet of the die. This device comprises an assembly of juxtaposed elements defining the central passageway, an inlet unit disposed at one end of said assembly and in which are formed passageways respectively connected to the extruders, each element comprising at least one radial channel communicating with the central channel and with one of the passages of the inlet unit, optionally through passageways formed in the elements located on the downstream side relative to the flow of the material.

With this arrangement, each element of the assembly of juxtaposed elements is assigned to a layer or well-determined layers of the multi-layer roll of material introduced into the die.

This arrangement implies a successive arrival of each of the flows at this central roll of material which will itself be finally introduced into the die.

The regularity and the homogeneity of the roll delivered to the die depends in particular on those of the extruders, on the relative viscosities of the plastic materials employed and also on the dimensions of the various feed channels and passageways. Further, the contours of the various passageways and channels determine to a large extent the cross-sectional shape of the stream of material delivered to the main roll of material in the central channel.

Consequently, the cross-sectional shape of the various streams of the issuing roll of material must be previously chosen by a suitable dimensioning of the passageways and channels.

Further, in order to adapt a given element to a given material delivered by the extruders, the shape of the radial passageways of the corresponding element must be changed. Consequently, these adapting operations must be carried out before the operation of the plant by dismantling the device.

During operation, the distribution of the material of each layer on the surface of the adjacent material may be corrected by a modification of the relative viscosity of the materials by adjustment of the temperature of the materials introduced.

Now, the temperature-adjusting range is narrow, since, for an excessively low temperature, there is a risk of clogging the radial passageway of the rings, and, for an excessively high temperature, there is a risk of burning the material. Moreover, the reaction time following on each temperature change is relatively long, so that merely using this means of adjustment in operation does not result in a satisfactory precision of the contour of the various layers in a rapid and easy manner.

SUMMARY OF THE INVENTION

An object of the invention is to provide a device for distributing thermoplastic material introduced for feeding a die forming multi-layer sheets, whose construction is very simple and which permits, by means of an operation easily carried out, the regulation and the adjustment during operation of the contour of the various streams of material in the distributor so as to obtain the adequate distribution at the outlet of the die while avoiding disturbances during the adjustments.

The invention therefore provides a device for distributing thermoplastic material introduced into a feed unit of a die for manufacturing multi-layer sheets which is connected to at lest two thermoplastic material inlets and which comprises an assembly of elements juxtaposed in such manner as to define a central channel connected to the inlet of the die, an inlet unit disposed at one end of said assembly of juxtaposed elements and in which there are provided passageways respectively connected to said inlets, each element comprising at least one radial channel opening into said central channel and communicating with one of the passageways of the inlet unit, this distributing device comprising, in the region of the junction of the radial supply channel of the additional material introduced into the receiving material previously introduced into the central channel, progressive regulating means disposed in each corresponding element of the feed assembly so as to modify instantaneously in the plane of superimposition of the thermoplastic material the cross-sectional shape of the corresponding stream of additional material in the central channel in order to obtain the desired distribution of this materil in the sheet at the outlet of the die.

According to another feature of the invention, the progressive regulating means comprises means for conducting the additional material coming from the radial channel to the central channel and means for regulating the width of the stream of material introduced relative to the width of said central channel as a function of the relative viscosity of the injected additional material, of the relative viscosity of the receiving material and of the temperatures of utilization of each of the materials

BRIEF DESCRIPTION OF THE DRAWINGS

Further features and advantages of the invention will be apparent from the following description which is given by way of a non-limiting example with reference to the accompanying drawings, in which :

FIG. 1 is a diagrammatic representation of a plant for manufacturing multi-layer sheets of thermoplastic material;

FIG. 2 is a diagrammatic perspective view of the feed assembly provided with the distributing device according to the invention;

FIG. 3 is a sectional view in a plane perpendicular to the axis of the central channel of the distributing device according to the invention;

FIG. 4 is an axial sectional view taken on line IV—IV of FIG. 3;

DETAILED DESCRIPTION OF THE PREFERRED EMBODIMENTS

Figure 6:
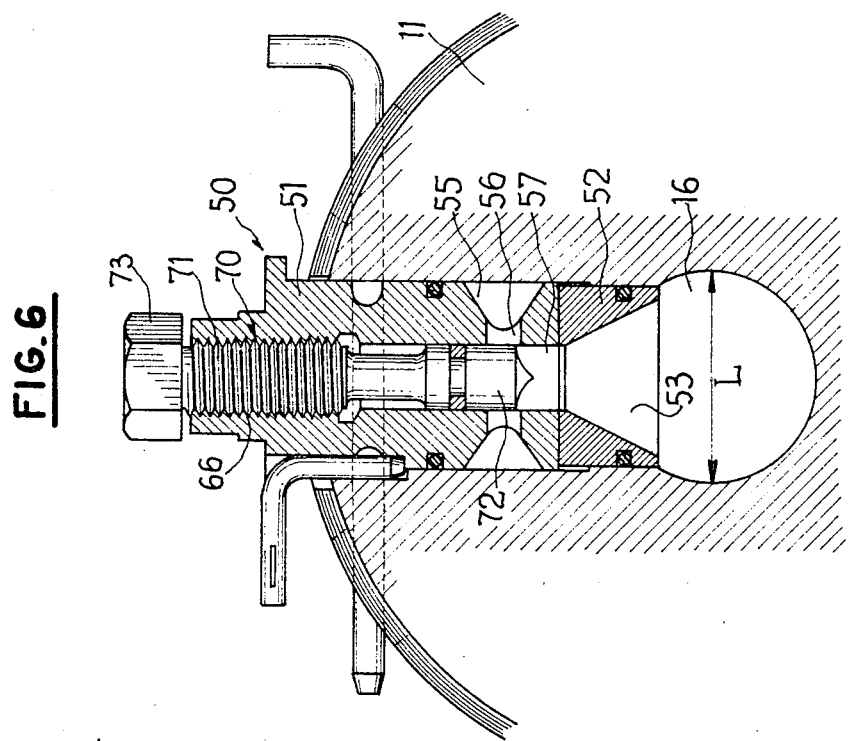
FIG. 6 is a view of another embodiment of the device according to the invention.

FIG. 1 shows a diagram of a plant for manufacturing multi-layer sheets of thermoplastic or like material comprising a feed assembly provided with the distributing device for the material introduced according to the invention. This plant comprises a die A whose inlet B is connected to a feed assembly 1. This feed assembly receives, directly, or through a manifold unit C, a plurality of flows of thermoplastic material of different types. In the illustrated embodiment, this assembly is connected to four extruders D1 to D4.

As can be seen in FIG. 2, the feed assembly 1 comprises juxtaposed hollow elements formed in particular by four elements 10 to 13 placed between an inlet unit 14 and an outlet unit 15 which are both coaxial with the elements 10 to 13.

All of these component parts are interconnected, for example, by screwthreaded rods (not shown).

The inlet unit 14 has four passageways 14a to 14d which are, at the upstream end, adapted to be connected to the respective extruders D1 to D4 (FIG. 1).

The elements 10 to 13 each comprise a central orifice, the alignment of which defines a central channel 16 of the feed assembly 1, which channel opens into a central outlet passageway 17 provided in the outlet unit 15 and adapted to be connected to the inlet B of the die A.

The element 10 has in its face confronting the inlet unit 14 a radial groove 18 which communicates with the passageway 14c of the inlet unit 14 and which opens into the central channel 16. This element also includes three axial passageways 19, 20, 21 which extend completely therethrough and which are angularly spaced 90° apart about the axis of the juxtaposed elements.

The element 11 has, first, two axial passageways 22 and 23 respectively communicating with the passageways 19 and 21 of the element 10. The element 11 also includes an axial passageway 24 in alignment with the passageway 20 of the element 10 and communicating, through a radial feed channel 25, with a vertical aperture or bore 26 provided inside the element 11. This vertical aperture or bore 26 extends through the upper part of the element 11 and communicates with the central channel 16. Placed inside this vertical aperture is a means 50 for progressively regulating the distribution of the material introduced into the central channel 16 and coming from the radial channel 25.

This regulating means 50 will be described with more detail hereinafter with reference to FIGS. 3 and 4.

The element 12 comprises a first axial passageway 27 which communicates with the axial passageways 22 and 19 of the elements 11 and 10 respectively. This element 12 also includes an axial passageway 28 in alignment with the passageway 23 of the element 11 and communicating, through a radial feed channel 29, with a vertical aperture or bore 30 provided inside the element 12. This vertical aperture or bore 30 extends through the upper part of the element 12 and opens into the central channel 16. Also placed in this vertical aperture is a means 50 for progressively regulating the distribution of the material introduced into the central channel 16 and coming from the radial channel 29.

The element 13 is provided with an axial passageway 31 which communicates with the axial passageways 27, 22 and 19, of the elements 12, 11 and 10 respectively. This axial passageway 31 communicates, through a radial feed channel 32, with a vertical aperture or bore 33 provided in the element 13. Also placed in this vertical aperture or bore 33 is a means 50 for progressively regulating the distribution of the material to be introduced into the central channel 16 and coming from the radial channel 32. As the element 13 is the last element of the feed assembly 1, it has no other connecting passageway.

Each regulating means 50 acts in the region of the junction between the radial channel (25, 29, 32) and the central channel 16 for supplying the additional material introduced into the central channel 16.

With reference now to FIGS. 3 and 4, there will be described in more detail the regulating means 50 placed for example in element 11, the other regulating means 50 disposed in the elements 12 and 13 being absolutely identical thereto.

FIGS. 3 and 4 show the element 11 with its central channel 16 into which opens the vertical aperture or bore 26 communicating with the radial feed channel 25 supplying the additional material to be introduced into the central channel 16.

Positioned in this vertical aperture or bore 26 is the regulating means 50 which comprises means for, on one hand, conveying the material coming from the radial feed channel 25 to the central channel 16 and, on the other hand, modifying the width of the stream of material introduced relative to the width of said central channel 16 such that the cross-sectional shape of the additional material fed from the feed channel 25 into the central channel 16 can be changed, the cross-sectional shape being taken in a plane perpendicular to the flow direction of the material through the central channel 16.

For this purpose, the regulating means 50 comprises a cylindrical body 51 provided with an interchangeable injection block 52 prevented from rotating with respect to the body 51 inside the aperture or bore 26.

The injection block 52 is provided in its upper part with a T-shaped flange 52a (FIG. 4) in axial section, which is introduced in a corresponding groove 51a provided inside the cylindrical body 51 so as to permit a rapid changing of the injection block when the assembly has been withdrawn from the cylilndrical aperture or bore 26.

The injection block 52 has internally a nozzle 53 terminating in its lower part in an injection zone defined by a contour of elongated shape for the introduction and the distribution of the material in the central channel 16. This injection zone is for example formed by a slot 54 having a rectangular cross-sectional shape.

The cylindrical body 51 is provided with an annular groove 55 which communicates with the nozzle 53 of the injection block 52 through small orifices 56 and 57.

The cylindrical body 51 and the injection block 52 are maintained in the vertical aperture or bore 26 for example by two dowels 58 and 59 and positioned in such manner that the radial channel 25 supplying the material is put in communication with the central channel 16 through the annular groove 55, the small orifices 56 and 57, and the nozzle 53. The dowels 58 and 59 are engaged in apertures provided in the element 11 and also in a circular groove 60 provided in the body 51 which vertically locks the body while allowing rotation thereof with the injection block 52.

Further, the cylindrical body 51 includes means for rotational positioning thereof and locating the longitudinal axis of the elongated slot 54 of the injection block 52 relative to the longitudinal axis of the central channel 16.

For this purpose, the head of the cylindrical body 51 is formed by an adjusting wheel or knob 61 having, in a quarter of its periphery, notches 62 (FIG. 5) for the introduction of a small pin 63 which thus locks the assembly of the cylindrical body 51 and the injection block 52 and locates the position of the slot 54.

Figure 5:
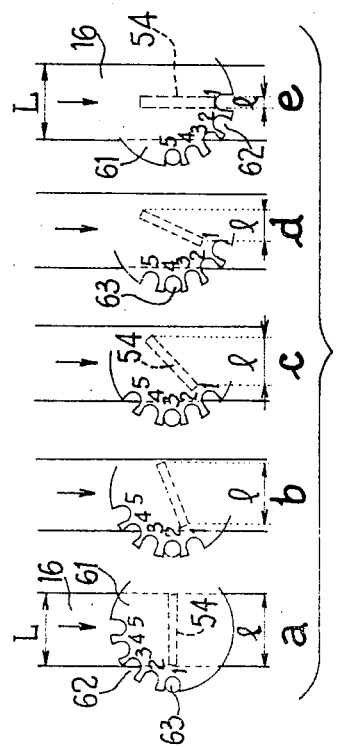
FIG. 5 is a diagrammatic view of the various positions of the distributing device according to the invention.

As can be seen in FIG. 5, the adjusting wheel or knob 61 has in front of each notch 62 indices or references 1 to 5 which for example correspond, in respect of the index 1, to a position of the axis of the elongated slot 54 perpendicular to the direction of flow of the material in the central channel 16, and, in respect of the index 5, a position of the axis of the elongated slot parallel to the direction of flow of the material, the indices 2 to 4 corresponding to intermediate positions of the slot.

The rotation of the wheel 61 is limited to 90° corresponding to the notches 62 by a stop 64 (FIG. 4).

According to another embodiment, the angular positioning of the slot 54 may be effected in any position within the required range of 90°, by means of a continuous variation device, for example of the worm and worm wheel type with an indexing on a vernier of sufficient precision.

At the outlet of the feed assembly 1, the various layers of plastic material introduced move at identical velocities, and the roll of material composed of these layers may thus enter the die A. The thicknesses of each layer in the final product is a function of the choice of the outputs of the respective extruders D1 to D4. The regularity and the homogeneity of the roll supplied to the die depends in particular on those of the extruders, on the relative viscosities of the plastic materials employed and also on the various channels and passageways of the feed assembly.

Consequently, depending on the viscosity of the material introduced, on the viscosity of the receiving material, and on the temperature of utilization of each of the materials, there is determined and regulated by the regulating means 50 placed in each of the elements 11, 12 and 13, the position of the slot 54 of said means 50 for the introduction of the material coming respectively from the extruders D2 to D4 onto the receiving material previously introduced into the element 10 and coming from the extruder D1, whereby layers are formed in accordance with the desired distribution.

Further, if in the course of the various controls effected at the outlet of the die A on the final sheet, it is found that one of the layers does not correspond to the desired distribution, it is possible to immediately act upon the corresponding regulating means 50 of said layer for the purpose of correcting this imperfection.

Indeed, in the event that the defective layer has an excessively convex contour, i.e. is thinner on its lateral edges, it is sufficient to modify the position of the slot 54 by increasing the ratio 1/L, in which 1 represents the width of the stream of material introduced and L the width of the central channel (FIG. 5) corresponding to the previously-introduced stream of receiving material.

Consequently, the wheel 61 is rotated so as to place the pin 63 in the corresponding notch, for example at reference 1 or 2, and thereby position the slot 54 as shown in FIG. 5a or 5b, which permits increasing the width 1 of the stream of material introduced and thus increasing the quantity of said material introduced on the lateral edges of the central channel 16.

On the other hand, if the defective layer has an excessively concave contour, the position of the slot 54 is modified by decreasing the ratio 1/L. Therefore, the wheel 61 is rotated in the opposite direction so as to place the pin 63 in the notch corresponding, for example, to the index 4 or 5, as shown in FIGS. 5d or 5e. In these positions, the width 1 of the stream of material introduced is reduced and the quantity of material introduced on the center of the central channel 16 is consequently increased.

The device for distributing the material injected according to the invention therefore constitutes in the plane of superimposition of the thermoplastic materials rapid and effective means for immediately correcting and effecting successive adjustments during the operation, which increases the precision of the distribution of the material introduced and thus results in a production of constant quality.

Further, this device enables the adjustments to be modified instantaneously in the event that one of the parameters of the various materials changes, with no need to dismantle the feed assembly.

Lastly, this device affords a multitude of adjustment choices with an infinity of distributions between the two limits with no disturbances during the adjustments.

FIG. 6 shows another embodiment of the distributing device according to the invention. In this case, there is provided inside the cylindrical body 51 of the regulationg means 50 a valve 70. For this purpose, the cylindrical body 51 has an axial bore 66 in which is screwed a screwthreaded rod 71 supporting in its lower part a hollow closure member or valving case 72 which opens into the orifice 56 at the level of the annular groove 55. By rotating the screwthreaded rod by means of the hexagonal head 73, the position of the closure member 72 is modified in the orifice 56, which increases or decreases the supply pressure of the material on the upstream side, and consequently homogeneizes the operation of the extruder.

The interchangeable injections blocks 52 may have a slot 54 of rectangular cross-sectional shape as shown in FIGS. 3 to 5.

Figure 7:
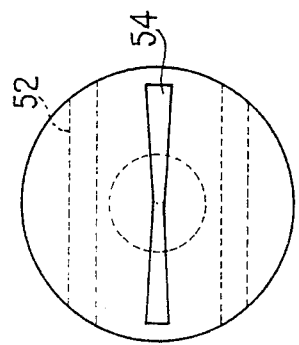
FIG. 7 is a view of another embodiment of the material injecting plug.

It will be understood that the slot 54 may have by way of a modification any shape and in particular a diabolo cross-sectional shape (FIG. 7), which results in a flow of material at the center which is less than the flow on the edges of the slot.

What is claimed is :

1. A device for distributing thermoplastic or like material to be introduced into a feed assembly of a die which has an inlet for manufacturing a multi-layer sheet, said device being for connection to at least two supplies of thermoplastic or like material and comprising an assembly of hollow elements juxtaposed in such manner as to define a central channel for connection to the inlet of the die and for receiving said thermoplastic or like material, an inlet unit disposed at an end of said assembly of juxtaposed elements and in which unit are provided passageways respectively connected to said supplies, each element comprising at least one radial channel for supplying additional material opening into said central channel at a junction and communicating with a respective one of said passageways of said inlet unit, said distributing device further comprising in each of said juxtaposed elements in the region of said junction between said central channel and the radial channel supplying the additional material introduced into the thermoplastic or like receiving material previously introduced into said central channel, a progressive regulation means disposed in each respective juxtaposed element of the assembly so as to modify instantaneously in a plane of superimposition of the materials the cross-sectional shape of the corresponding stream of additional material in said central channel so as to obtain the desired distribution of said additional material in the sheet at the outlet of the die, the progressive regulation means comprising means for conveying the additional material coming from the radial channel to said central channel and means for regulating the width of the stream of additional material introduced relative to the width of said central channel as a function of the relative viscosity of the additional material introduced, of the relative viscosity of said receiving material and of the temperature of utilization of each of said materials, the regulation means comprising a cylindrical body provided with an injection block which is prevented from rotating relative to said body, the injection block defining a nozzle which opens into said central channel, the cylindrical body having an annular groove and small orifices communicating with the annular groove and putting the radial channel supplying the additional material in communication with the nozzle of said injection block.

2. A device according to claim 1, wherein the nozzle terminates in a region of said central channel in an injection zone defined by a contour of elongated shape.

3. A device according to claim 2, wherein the injection zone is formed by a slot.

4. A device according to claim 3, wherein said slot has a rectangular cross-sectional shape.

5. A device according to claim 3, wherein said slot has a diabolo cross-sectional shape.

6. A device according to claim 2, wherein the regulation means comprises means for positioning in rotation and locating the longitudinal axis of the injection zone of the injection block relative to the longitudinal axis of said central channel.

7. A device according to claim 6, wherein means for immobilizing and indexing said regulation means comprise an adjusting wheel provided in an upper part of the cylindrical body and including in substantially a quarter of its periphery notches for the introduction of a small locking pin.

8. A device according to claim 1, wherein the regulation means comprises a valve for adjusting an upstream pressure of the additional material and homogenizing operation of the corresponding supply.

9. A device according to claim 8, wherein the valve includes a valving case which opens into at least one of the orifices in the region of the annular groove of the cylindrical body of the regulation means.

10. A feed assembly for distributing extrudable material introduced into the feed assembly, the feed assembly having an outlet connectable to an inlet of a die for manufacturing a multi-layer sheet, the feed assembly including an inlet unit at one end thereof, the inlet unit having at least two passageways therein, each of which is connectable to a separate source of extrudable material, the feed assembly unit further including a plurality of hollow elements, each of said hollow elements having one end thereof connected to an end of at least another one of said hollow elements with a central channel extending through said hollow elements, said central channel defining a flow path for the extrudable material traveling in a flow direction through said central channel to the inlet of the die, each of said hollow elements including a feed channel in fluid communication with a respective one of said passageways in said inlet and with said central channel for feeding additional extrudable material into said central channel, and progressive regulation means in each of said hollow elements for changing a cross-sectional shape of the additional extrudable material fed from said feed channel into said central channel, said cross-sectional shape being taken in a plane perpendicular to said flow direction of extrudable material through said central channel.

11. The feed assembly of claim 10, wherein the progressive regulation means comprises means for conveying the additional material coming from the feed channel to said central channel and means for regulating a width of the stream of additional material introduced into said central channel relative to the width of said central channel as a function of the relative viscosity of the additional material introduced, of the relative viscosity of material introduced into said central channel prior to introduction of the additional material and of the temperature of utilization of material introduced into said central channel.

12. The feed assembly of claim 11, wherein the regulation means comprises a cylindrical body provided with an injection block which is prevented from rotating relative to said cylindrical body, the injection block having a nozzle therein which opens into said central channel.

13. The feed assembly of claim 12, wherein the cylindrical body includes an annular groove therein and at least one orifice in fluid communication with the annular groove and the nozzle of the injection block to supply the additional material fed from the feed channel to the nozzle of said injection block.

14. The feed assembly of claim 13, wherein the nozzle has an elongated opening therein which defines an injection zone in a region of said central channel.

15. The feed assembly of claim 14, wherein the opening in the nozzle has a shape of a slot.

16. The feed assembly of claim 15, wherein said slot has a rectangular cross-sectional shape.

17. The feed assembly of claim 15, wherein said slot has a diabolo cross-sectional shape.

18. The feed assembly of claim 14, wherein the regulation means comprises means for positioning in rotation and locating a longitudinal axis of the injection zone of the injection block relative to the longitudinal axis of said central channel.

19. The feed assembly of claim 18, further including means for immobilizing and indexing said regulation means comprising an adjusting wheel provided in an upper part of the cylindrical body and including in substantially a quarter of its periphery notches for the introduction of a small locking pin.

20. The feed assembly of claim 13, wherein the regulation means includes a valve for adjusting an upstream pressure of the additional material and homogenizing operation of the corresponding supply of the additional material.

21. The feed assembly of claim 20, wherein the valve includes a valving case which opens into the orifice in the region of the annular groove of the cylindrical body of the regulation means.

* * * * *